UNITED STATES PATENT OFFICE.

JOHN R. MacMILLAN, OF NIAGARA FALLS, NEW YORK, ASSIGNOR TO NIAGARA ALKALI COMPANY, OF NIAGARA FALLS, NEW YORK, A CORPORATION OF NEW YORK.

PROCESS OF RECOVERING HIGH-GRADE POTASH PRODUCTS.

1,254,521.  Specification of Letters Patent.  Patented Jan. 22, 1918.

No Drawing.  Application filed October 9, 1916.  Serial No. 124,575.

*To all whom it may concern:*

Be it known that I, JOHN R. MACMILLAN, a citizen of the United States, residing at Niagara Falls, in the county of Niagara and State of New York, have invented certain new and useful Improvements in Processes of Recovering High-Grade Potash Products, of which the following is a specification.

This invention relates to processes of recovering high grade potash products; and it comprises a method of separating and recovering potassium as bicarbonate from solutions containing both potassium and sodium carbonates (materials containing both alkalis in other forms than as carbonates being, if necessary, preliminarily treated to convert such other forms into carbonates, partly or wholly, and to bring such carbonates into solution) wherein such solutions are brought to a density of about 40° Baumé, gassed with carbon dioxid, (or gases containing the same) to separate sodium as precipitated bicarbonate, and are then cooled or chilled to a lower temperature than that used in separating the sodium bicarbonate to crystallize out potassium bicarbonate in a substantially pure form, the mother liquor from the last operation being, if desired, returned for reconcentration and retreatment by the described process, either alone or in admixture with fresh solution; all as more fully hereinafter set forth and as claimed.

The separation of potassium and sodium salts on a large scale by any simple, ready and expeditious operation offers many technical difficulties. Usually a number of crystallizations and other operations are necessary to obtain even an approximately pure product.

I have found that the differential solubilities of the carbonates and bicarbonates of sodium and potassium are capable of being employed to give a substantially clean separation in a single operation. If a solution containing both alkalis as carbonates and of a substantial degree of concentration, say a specific gravity of about 40° Baumé, be cooled down, say to −5° to 0° C., a large part of the sodium crystallizes out as crystals of the hydrated normal carbonate, which may be removed and applied to any purpose. This step I often use as a preliminary operation, and particularly with materials relatively rich in sodium carbonate, since it offers a number of economies. It is however not directly applicable to solutions containing the alkalis in caustic form as hydroxids. Such solutions must first be carbonated.

I have found that a solution such as described (with or without the stated preliminary separation of normal sodium carbonate by cooling) on treatment with carbon dioxid in amount sufficient to convert the alkalis into bicarbonates, first deposits its sodium, or the greater part thereof, as a bicarbonate which separates as a precipitate. This gassing should be done at the normal temperature, or slightly above say 20° to 30° C. If the solution after so gassing be then cooled to a lower temperature than that just employed, this low temperature being advantageously as low as, say minus 1° to minus 5° C. or thereabout, it deposits the contained potassium in the form of crystals of substantially pure potassium bicarbonate. These crystals when dried, with ordinary washing, contain, ordinarily, not over 2 to 4 per cent. sodium bicarbonate and under 1 per cent. sulfates and chlorids even in the case of solutions containing much sulfate and chlorid.

In the present invention, therefore, I first gas the solution with carbon dioxid at one temperature to precipitate sodium as bicarbonate and then cool the mother liquid to a lower temperature to recover the potassium bicarbonate in crystallized form. The mother liquor is nearly free of potassium compounds. It may be reconcentrated to 40° Baumé and sent back for retreatment in the same manner or it may be mingled with fresh solutions about to be treated in the described manner.

The operation of the present process depends upon the fact that sodium bicarbonate is quite insoluble in the concentrated liquid at temperatures which will hold all the potassium bicarbonate in solution, so the sodium bicarbonate is first formed and removed and then the temperature is dropped to cause potassium bicarbonate to crystallize out. In other words the solubility of potassium bicarbonate is not only greater than that of sodium bicarbonate but it is much more affected by temperature. The particular temperatures used for forming and removing the sodium bicarbonate and for crystallizing out the potassium bicarbonate therefore depend largely upon the ratio of sodium to potassium and the concentration of the liquor; but those indicated I find generally to be best.

In the gassing operation any convenient source of carbon dioxid may be employed, such as scrubbed and cooled products of combustion, lime kiln gases; gases from magnesia making operations, etc. Whatever the source of the carbon dioxid, the gas containing it is best employed methodically, being passed through a series of containers for the liquid to be carbonated. This liquid may, for instance, be caused to pass down through a series of towers through which the gases go consecutively, connections being provided by which the liquid may first be exposed to nearly exhausted gas and after a time to a gas containing more $CO_2$ and finally to the fresh gas; or a countercurrent apparatus may be used. In employing towers, a part of the sodium bicarbonate generally crystallizes out in them and on the filling so that the tower must be cleaned out from time to time. But the bulk of the sodium bicarbonate separates in the storage tanks to which the liquid is run from the towers. From these storage tanks the crystallized material is fished out from time to time. All the potassium remains in solution as potassium bicarbonate which is freely soluble at the temperatures used in this operation; and is removed in the next or chilling step.

The described operation is of general application to a wide variety of alkaline bitterns containing substantial proportions of the alkalis in carbonated form, such as mother liquors, concentrated brines and the like. In concentrating liquids of this character to about 40° Baumé the bulk of the contained chlorids and sulfates deposits out, and if the liquid be reasonably rich in carbonates, it is then ready for the application of the present process. In the case of rocks, saline materials and the like not containing carbonated or caustic alkalis originally, the contained alkalis may be carbonated by any suitable treatment; as for instance in the case of chlorids by treatment by the modified Solvay process applicable to potassium compounds, etc. In the case of sulfates they may be carbonated or causticized in any of the well known ways.

I regard my invention, however, as more particularly applicable to the treatment of alkaline saline matters of natural origin containing alkaline carbonates; such as residues of lake and spring waters in the arid sections. As stated, with these materials, the presence of a large proportion of sulfates and chlorids makes no particular difference since these salts are for the most part automatically removed in the concentration of the liquid to 40° Baumé. The crystallized salts which are generally richer in potassium than the concentrated liquid, may be sold for fertilizing purposes or may be converted into carbonates and put through the present process.

Where the preliminary chilling of the solution to remove sodium carbonate is resorted to, about as much soda can be thus removed as will subsequently be removed by the gassing operation; that is about half the sodium is removed as carbonate in the chilling and about half as bicarbonate in the gassing.

The concentration of a liquid to 40° Baumé may be done in any of the usual ways of evaporating liquid by any of the usual apparatus.

In one specific embodiment of the present invention with a saline liquid of natural origin coming from arid regions, the liquor on concentration to about 40° Baumé deposits a crop of crystals of sulfates and chlorids containing large amounts of potassium sulfate. The dissolved salts in the concentrated liquor are for the most part carbonates. This concentrated liquor contains potassium carbonate (or potassium equivalent to carbonate) in the amount of about 15 per cent. The liquid is first treated by chilling down to about minus 10° C. A crop of salts deposits but none of the potassium carbonate is eliminated at this stage; the deposit being practically free of potassium carbonate and other potassium salts and being substantially pure normal decahydrated sodium carbonate (sal-soda). After the chilling operation the liquid is separated from the crystals and warmed to a temperature of from 20° to 30° C. (the particular degree depending largely upon the amount of sodium present) and is then treated with carbon dioxid in the form of products of combustion, lime kiln gases, etc. Lime kiln gases, which may be obtained of a concentration higher than 25 per cent., are desirable. The richness of the gas is not very material, but of course, it is better to operate with rich gas. The liquor may be passed through steel towers packed with stoneware rings or cylinders over which the liquid trickles in countercurrent against the gas. The sodium bicarbonate in part is deposited upon the tower filling. This renders it necessary that the towers be boiled out from time to time. The gassed liquid emerging from the base of the tower passes into tanks wherein the residue of the sodium bicarbonate separates out as a crystal sludge and settles to the bottom. It is better to effect this operation in a methodical manner, the gas passing through a series of towers and flowing in countercurrent to the liquor to be treated; the arrangement being such that the fresh gas meets nearly saturated liquid. It is convenient to have six or eight towers in series. The liquid flowing through the successive towers flows from each through settling tanks located between each pair of towers.

In another typical embodiment of my invention I use a western brine containing 14 to 15 per cent. of dissolved salts. The composition of these salts expressed in percentages of the solid matter is: $K_2O$, 30.85; $Na_2O$, 25.31; $SO_3$, 13.77; $CO_2$ (as carbonates), 19.79; $CO_2$ (as bicarbonates), 7.74; and Cl, 4.07. As this analysis shows, the brine contains more $CO_2$ than is necessary to form normal carbonates. This brine on reduction to 40° Bé. liquor lost most of the excess of $CO_2$ and deposited a crop of salts. The mother liquor of 40° Bé. contained, in percentages, of $K_2O$, 13.0–14.0; $Na_2O$, 9.0–10.0; $SO_3$, .5–.8; Cl, 2.0–3.0; and $CO_2$, 11.0–12.0. The salts deposited, expressed in percentages, were: $K_2SO_4$, 50.3; $Na_2SO_4$, 25.4; NaCl, .23; $Na_2CO_3$, 2.65; and moisture, etc., total, 21.42. The mother liquor on gassing with carbon dioxid deposited sodium bicarbonate and gave a residual liquid containing, in percentages, $K_2O$, 13.0–14.0; $Na_2O$, 2.0–2.5; $SO_3$, .5–8; Cl, 2.0–3; $CO_2$ (as carbonate), .5–1.0 and $CO_2$ (as bicarbonate), 6.5–7.0. It will be noted, as shown by the above figures, that by concentrating the original liquid to 40° Bé, the sulfate came out with a little chlorid. If the evaporation be carried further than 40° Bé., a double carbonate of sodium and potassium separates.

The sodium bicarbonate settling in these tanks is fished out from time to time, washed and dried. It is practically free from potassium and may be used for any purpose for which sodium bicarbonate (baking soda) is applicable.

The settled liquid drawn off from the sodium bicarbonate is next reduced in temperature by cooling coils or other means, the temperature to which it is reduced being best between −1° and −5° C. Potassium bicarbonate is relatively insoluble in this liquid at this temperature and crystallizes out, giving a material which is substantially pure.

If the liquid is rich in potassium, crystallization begins as soon as the liquid is cooled after removing the sodium bicarbonate but it is best to cool as low as indicated. The final mother liquid is sent back to the evaporators for reconcentration to 40° Baumé and the concentrated liquor is mixed with the fresh material coming into the system.

The operation with any other material containing potassium and sodium and rich in dissolved carbonates is substantially the same; that is, the liquid is first concentrated to about 40° Baumé and thereafter with or without a preliminary cooling to crystallize out normal sodium carbonate, is gassed at the ordinary temperature or a little above to form and separate sodium bicarbonate and is then cooled to a lower temperature to cause potassium bicarbonate to crystallize out.

What I claim is:—

1. In the separation of potassium and sodium the process which comprises gassing with carbon dioxid a concentrated solution carrying potassium and sodium carbonates till the sodium is substantially separated as sodium bicarbonate and then lowering the temperature till the potassium bicarbonate crystallizes out.

2. In the separation of potassium and sodium the process which comprises gassing with carbon dioxid a solution of a density of about 40° Baumé and carrying sodium and potassium in an alkaline form till the sodium is substantially separated as sodium bicarbonate and then lowering the temperature till the potassium bicarbonate crystallizes out.

3. In the separation of potassium and sodium the process which comprises cooling a solution containing sodium and potassium carbonates till a portion of the sodium separates as normal carbonate, raising the temperature and gassing with carbon dioxid to convert the carbonates into bicarbonates, separating sodium bicarbonate and again lowering the temperature to cause potassium bicarbonate to crystallize out.

4. In the separation of potassium and sodium the process which comprises concentrating an alkaline liquor containing potassium and sodium as carbonates and as other salts, by evaporation to a density of about 40° Baumé, separating crystallized salts, chilling to separate part of the sodium as normal carbonate, raising the temperature and gassing with carbon dioxid to separate further sodium as bicarbonate, and then cooling to a low temperature to cause potassium bicarbonate to crystallize out.

5. In the separation of potassium and sodium from alkaline liquids containing the same in carbonated form, the process which comprises evaporating such a liquid to a density of about 40° Baumé and removing crystallized salts, cooling the liquid to about the freezing point of water and separating crystallized normal carbonate of sodium, raising the temperature to about 20° to 30° C. and gassing with carbon dioxid to produce and separate sodium bicarbonate, removing the sodium bicarbonate and again cooling to or below the freezing point of water to cause a separation of potassium bicarbonate.

6. In the separation of potassium and sodium from alkaline liquids containing the same, the process which comprises concentrating such a liquid to about 40° Baumé, gassing with carbon dioxid at a temperature around 20–30° C. to deposit sodium as bicarbonate, cooling to or below the freezing point of water to cause a separation of potassium bicarbonate, removing such bicarbonate, reëvaporating the mother liquor to about 40° Baumé and repeating the process.

7. In the separation of potassium and sodium the process which comprises treating a solution containing carbonates of potassium and sodium with carbon dioxid until such carbonates are converted into bicarbonates, such treatment being at a temperature where the potassium bicarbonate remains in solution, separating the insoluble sodium bicarbonate thus produced and lowering the temperature sufficiently to cause potassium bicarbonate to crystallize out.

8. The process of treating liquids containing potassium and sodium as carbonates and also containing other soluble salts which comprises evaporating such a liquid to a density of about 40° Baumé, separating the salts crystallizing out, chilling and removing separated crystals of normal sodium carbonate, warming and treating the mother liquor with carbon dioxid to separate more sodium as bicarbonate and recovering potassium bicarbonate from the new mother liquor.

9. The process of treating liquids containing potassium and sodium as carbonates and also containing other soluble salts which comprises evaporating such a liquid to a density of about 40° Baumé, separating the salts crystallizing out, chilling and removing separated crystals of normal sodium carbonate, warming and treating the mother liquor with carbon dioxid to separate more sodium as bicarbonate and again cooling to crystallize out potassium bicarbonate.

In testimony whereof, I affix my signature hereto.

JOHN R. MacMILLAN.